(12) United States Patent
Watts et al.

(10) Patent No.: US 8,006,387 B2
(45) Date of Patent: Aug. 30, 2011

(54) METHOD AND APPARATUS FOR HOLDING PARTS DURING MANUFACTURING PROCESSING

(75) Inventors: Michael L. Watts, Tacoma, WA (US); Mark Michael Walker, Bonney Lake, WA (US)

(73) Assignee: The Boeing Company, Chicago, IL (US)

( * ) Notice: Subject to any disclaimer, the term of this patent is extended or adjusted under 35 U.S.C. 154(b) by 373 days.

(21) Appl. No.: 11/862,602

(22) Filed: Sep. 27, 2007

(65) Prior Publication Data

US 2009/0084898 A1 Apr. 2, 2009

(51) Int. Cl.
*B24B 1/00* (2006.01)

(52) U.S. Cl. .......... 29/897.312; 29/897.2; 29/897.3; 29/897.31

(58) Field of Classification Search .......... 29/897.312, 29/897.2, 897.3, 897.31, 429, 430
See application file for complete search history.

(56) References Cited

U.S. PATENT DOCUMENTS

| 6,743,079 B2 * | 6/2004 | Bown et al. .......... 451/51 |
| 2004/0234352 A1 * | 11/2004 | Vanderpol et al. .......... 409/178 |
| 2006/0196035 A1 | 9/2006 | Opperman |

FOREIGN PATENT DOCUMENTS

| DE | 101006011216 U1 | 2/2007 |
| JP | 8332572 A | 12/1996 |
| JP | 2003230985 A | 8/2003 |

* cited by examiner

*Primary Examiner* — David Bryant
*Assistant Examiner* — Christopher Besler
(74) *Attorney, Agent, or Firm* — Yee & Associates, P.C.

(57) ABSTRACT

A method for processing parts. In one advantageous embodiment, a setoff set of studs are welded to a part to form a set of fixed studs. A set of tabs are attached to the set of fixed studs. The set of tabs are affixed to a manufacturing tool.

8 Claims, 6 Drawing Sheets

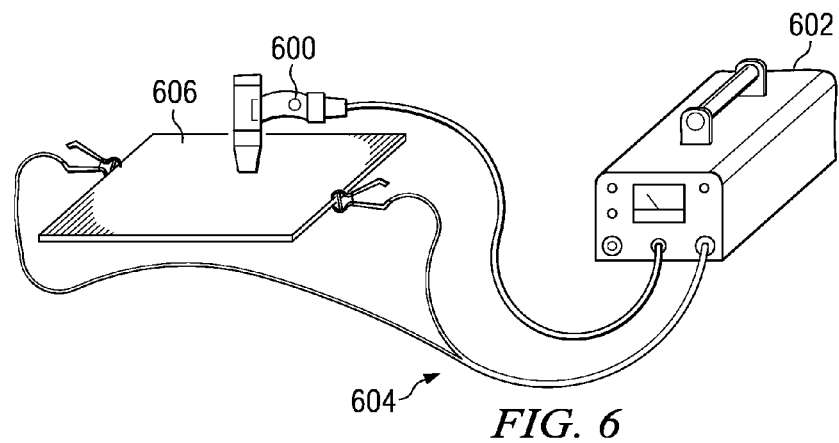
*FIG. 6*
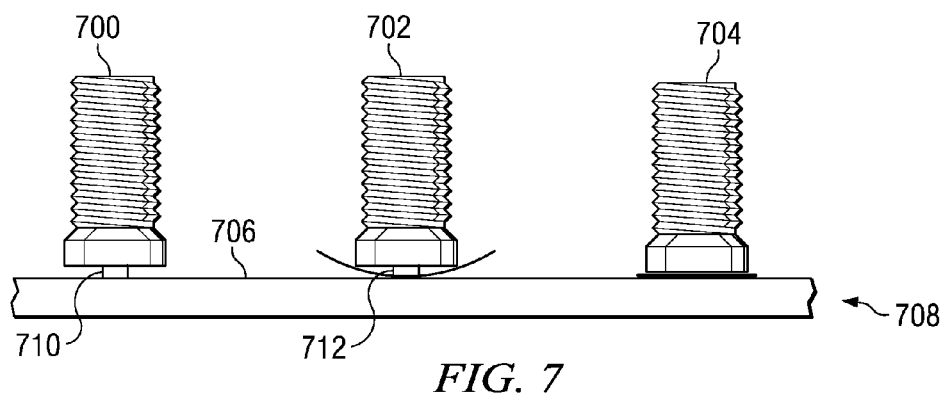
*FIG. 7*
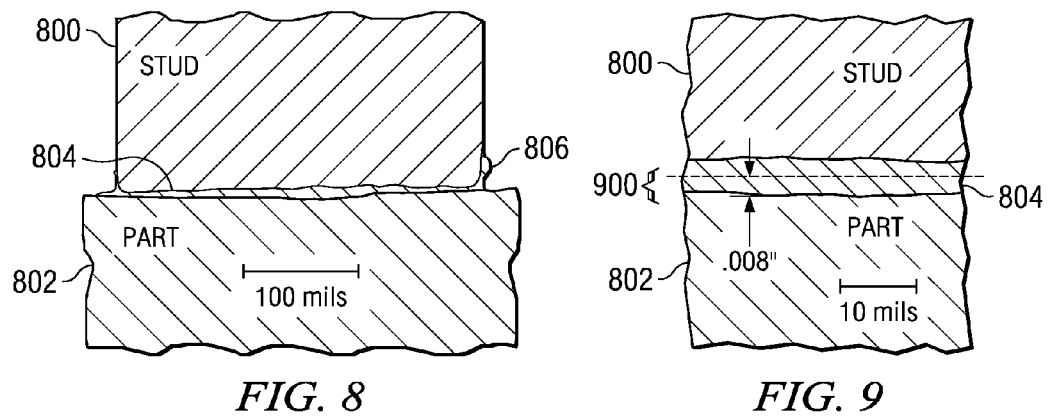
*FIG. 8*  *FIG. 9*

METHOD AND APPARATUS FOR HOLDING PARTS DURING MANUFACTURING PROCESSING

BACKGROUND INFORMATION

1. Field

The present disclosure relates generally to manufacturing parts and in particular to a method and apparatus for holding parts during manufacturing processing.

2. Background

Manufacturing involves the use of tools and labor to produce or make things for use or sale. With this type of process, raw materials are transformed into finished goods or products, typically on a large scale. With the manufacturing of an aircraft, metal working combined with other operations, such as fatigue enhancement, chemical processing, and application of paint are often performed to create finished structures or machine parts. This metal working may include processes, such as milling, turning, cutting, drilling, and threading.

With these processes, it is common to hold a part in place while a particular process is being performed. For example, in creating a part, such as an air foil or frame for an aircraft, a block of raw material may be machined to form the component. This block of raw material is typically made of a metal, such as titanium, steel, or aluminum. This block of material is typically larger than the component being made. For example, in manufacturing a frame for a fuselage, a portion of the frame may be machined or cut out of a rectangular piece of titanium. The typical "buy to fly" ratio may be thirty to one in which twenty-nine pounds of material is machined into chips to create one pound of a part that is used on an aircraft.

For example, the size or amount of material needed for a particular part takes into account a need for sufficient material to machine or cut out sections that may be used to hold the part during manufacturing. Taking into account a need for sections that may be used to hold the part, the amount of material used to create the part increases. The amount of material needed includes more than just the sections for holding the part during manufacturing. The block of material also is large enough to allow for these components to be machined or created during the machining process.

SUMMARY

The different advantageous embodiments provide a method for processing parts. In one advantageous embodiment, a setoff set of studs are welded to a part to form a set of fixed studs. A set of tabs are attached to the set of fixed studs. The set of tabs are affixed to a manufacturing tool.

In another advantageous embodiment, a manufacturing system comprises a plurality of studs, a welding unit, a plurality of tabs, and a manufacturing tool. The welding unit is capable of rigidly attaching the plurality of studs to a part. The plurality of tabs is capable of being attached to studs in the plurality of studs. Each tab in the plurality of tabs has a channel to receive a portion of a stud and mechanically attach the stud to the tab. The manufacturing tool is capable of holding the part in place for processing using the plurality of tabs attached to the plurality of studs.

The features, functions, and advantages can be achieved independently in various embodiments of the present invention or may be combined in yet other embodiments in which further details can be seen with reference to the following description and drawings.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an advantageous embodiment of the present invention when read in conjunction with the accompanying drawings, wherein:

FIG. 6 is a diagram illustrating the welding of studs onto a part with a welding unit in accordance with an advantageous embodiment;

FIG. 7 is a diagram illustrating the welding of a stud onto a part in accordance with an advantageous embodiment;

FIG. 8 is a cross-sectional view of a stud attached to a part in accordance with an advantageous embodiment;

FIG. 9 is a more detailed cross-sectional view of an interface between a stud and a part in accordance with an advantageous embodiment;

DETAILED DESCRIPTION

Figure 1:
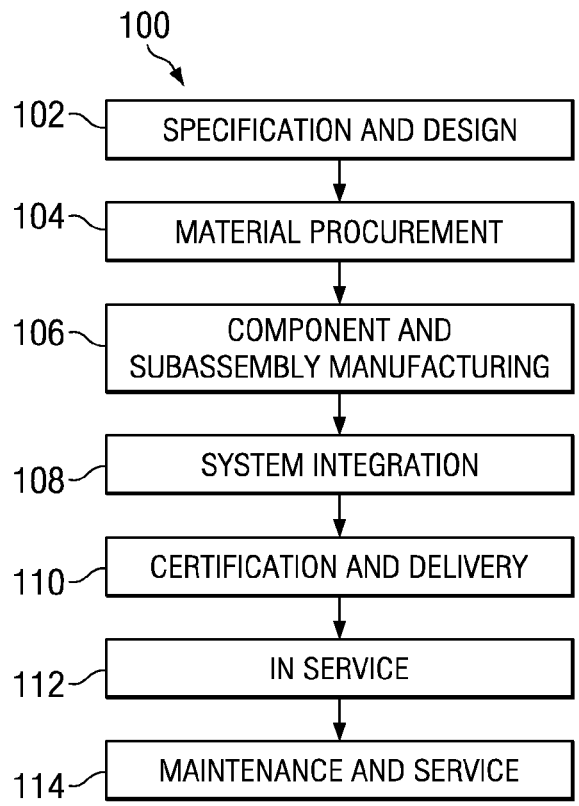
FIG. 1 is a diagram illustrating an aircraft manufacturing and service method in accordance with an advantageous embodiment.
Figure 2:
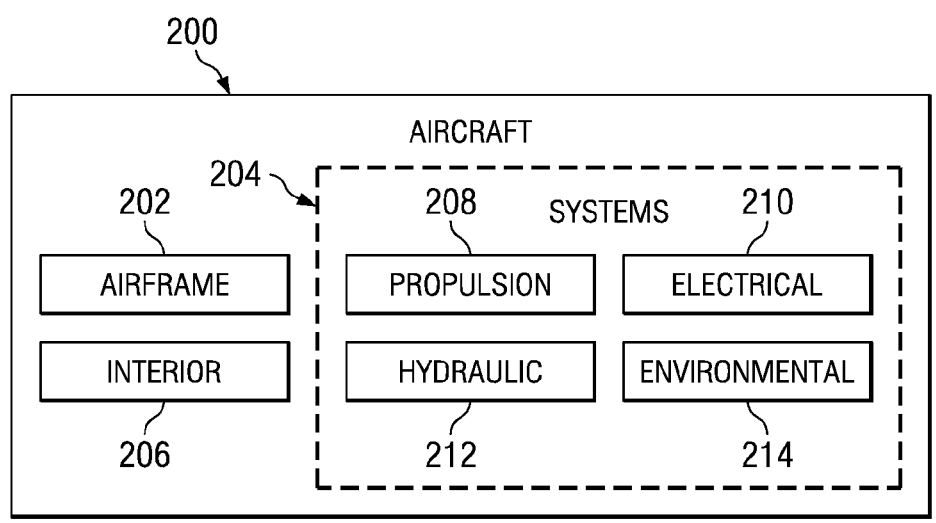
FIG. 2 is a diagram of an aircraft in which an advantageous embodiment may be implemented.

Referring more particularly to the drawings, embodiments of the disclosure may be described in the context of aircraft manufacturing and service method 100 as shown in FIG. 1 and aircraft 200 as shown in FIG. 2. Turning first to FIG. 1, a diagram illustrating an aircraft manufacturing and service method is depicted in accordance with an advantageous embodiment. During pre-production, exemplary aircraft manufacturing and service method 100 may include specification and design 102 of aircraft 200 in FIG. 2 and material procurement 104. During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, a diagram of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatus and methods embodied herein may be employed during any one or more of the stages of aircraft manufacturing and service method 100 in FIG. 1. For example, components or subassemblies produced in component and subassembly manufacturing 106 in FIG. 1 may be fabricated or manufactured in a manner similar to components or subassemblies produced while aircraft 200 is in service 112 in FIG. 1.

Also, one or more apparatus embodiments, method embodiments, or a combination thereof may be utilized during production stages, such as component and subassembly manufacturing 106 and system integration 108 in FIG. 1, for example, by substantially expediting the assembly of or reducing the cost of aircraft 200. Similarly, one or more of apparatus embodiments, method embodiments, or a combination thereof may be utilized while aircraft 200 is in service 112, for example and without limitation, to maintenance and service 114 in FIG. 1.

The different embodiments provide a method and apparatus for processing a part. In one advantageous embodiment, a set of studs are welded to a part to form a set of fixed studs. A set of tabs are attached to the set of fixed studs. The set of tabs are affixed to a manufacturing tool. This type of tab allows for less materials to be used in initially forming the part because additional material is not required to produce tabs on the part.

Figure 3:
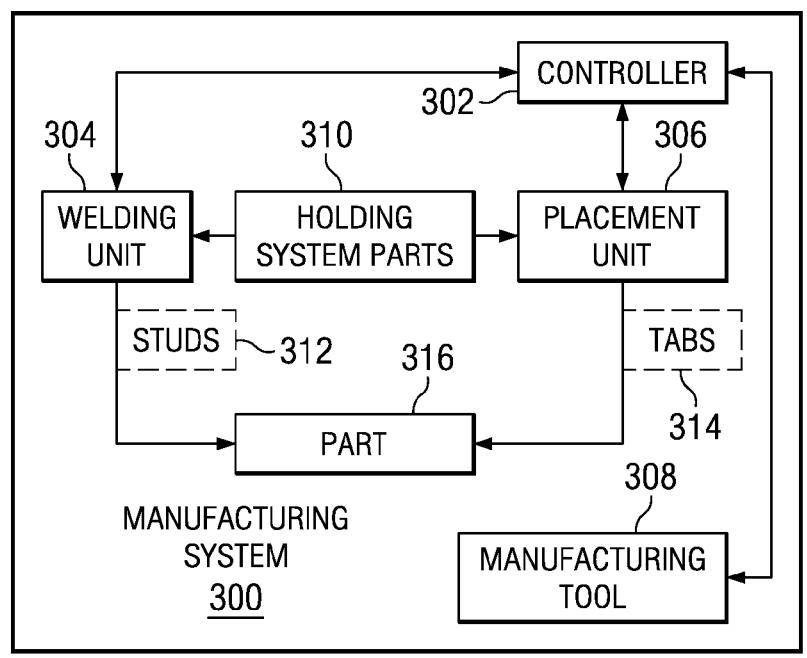
FIG. 3 is a block diagram illustrating components used to manufacture a part in accordance with an advantageous embodiment.

With reference next to FIG. 3, a block diagram illustrating components used to manufacture a part is depicted in accordance with an advantageous embodiment. In this example, manufacturing system 300 includes controller 302, welding unit 304, placement unit 306, manufacturing tool 308, and holding system parts 310. Studs 312 and tabs 314 are obtained from holding system parts 310. These different components are used to perform manufacturing processes on part 316.

Welding unit 304 may obtain studs 312 from holding system parts 310 and weld studs to part 316. Placement unit 306 obtains tabs 314 and attaches those tabs to studs 312. The combination of studs 312 and tabs 314 form a holding component used to hold part 316 when processing part 316 with manufacturing tool 308. Controller 302 controls welding unit 304, placement unit 306, and manufacturing tool 308. Controller 302 controls the application or welding of studs 312 by welding unit 304 to part 316. Further, controller 302 controls the attachment of tabs 314 by placement unit 306 to studs 312. Also, controller 302 may control the processing of part 316 by manufacturing tool 308.

In these examples, the different components are illustrated as functional components and may be implemented using a variety of different systems or personnel. For example, controller 302 may be a computer and/or human operator. Welding unit 304 may be a hand held welding unit. In other examples, welding unit 304 may be a robotic welding unit that automatically receives or feeds studs from holding system parts 310 into the welding unit for welding studs 312 to part 316. Placement unit 306 may be, for example, the same human operator as controller 302. In other embodiments, placement 306 may be a robotic system that obtains tabs 314 from holding system parts 310 and attaches tabs 314 to studs 312 on part 316.

Manufacturing tool 308 may take a variety of forms. For example, manufacturing tool 308 may be a computer, a robotic manufacturing tool, or a manufacturing tool operated by a human operator. Manufacturing tool 308 may be, for example, without limitation, a milling machine, a lathe, a cutting machine, a drilling and threading machine, a grinding machine, a welding machine, or a paint system.

Figure 4:
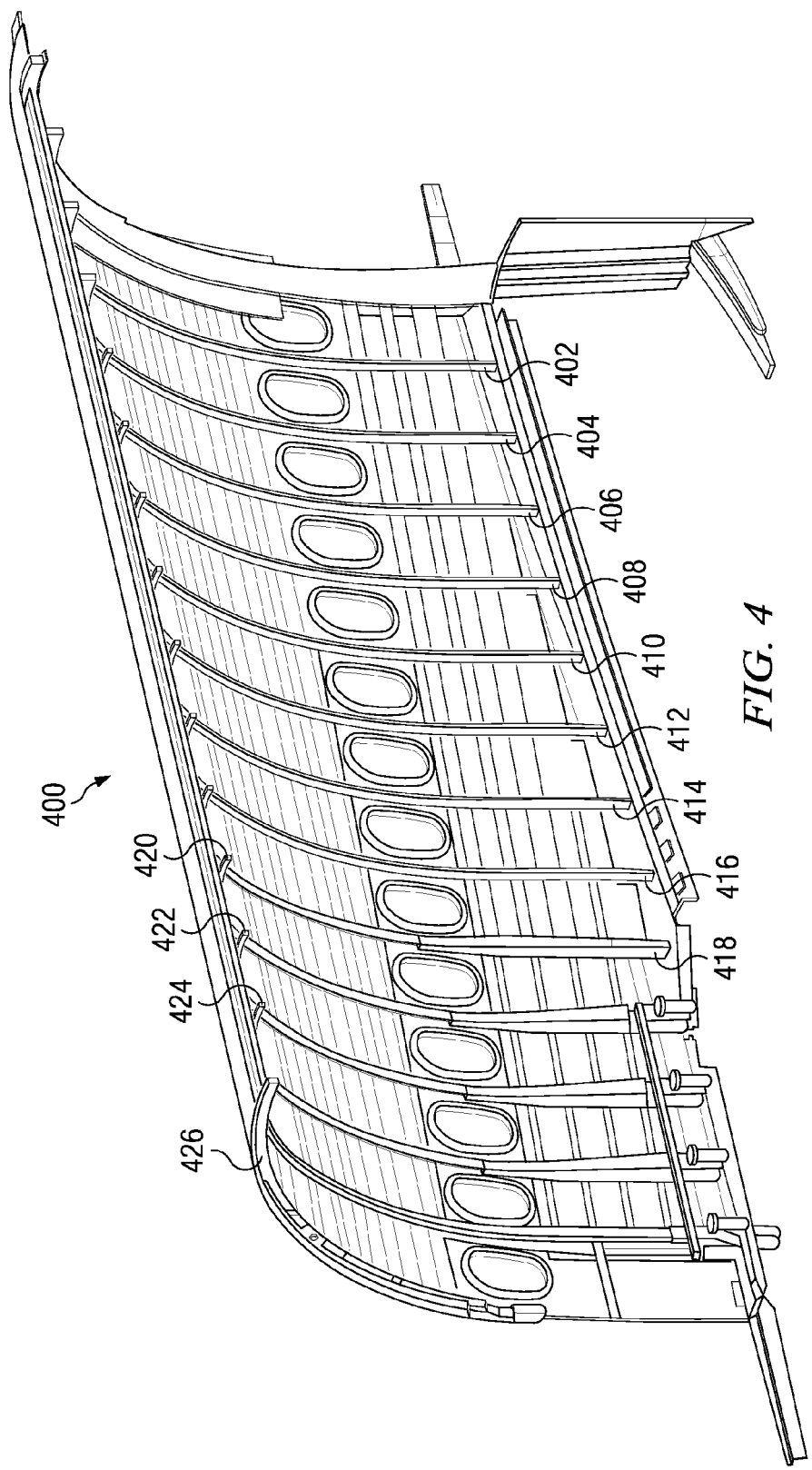
FIG. 4 is a diagram illustrating parts on which tabs may be implemented in accordance with an advantageous embodiment.

Turning now to FIG. 4, a diagram illustrating parts on which tabs may be implemented is depicted in accordance with an advantageous embodiment. In this example, structure 400 is a portion of a fuselage. Structure 400 includes side frames, such as frames 402, 404, 406, 408, 410, 412, 414, 416, 418, 420, 422, 424, and 426. These different parts may be manufactured within manufacturing system 300 in FIG. 3 using tabs.

Figure 5:
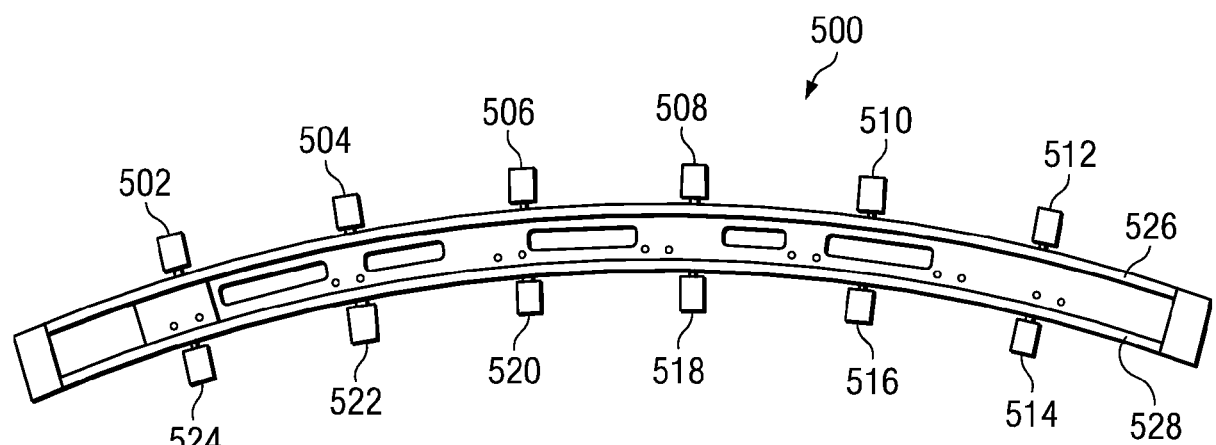
FIG. 5 is a diagram illustrating a frame with tabs in accordance with an advantageous embodiment.

With reference now to FIG. 5, a diagram illustrating a frame with tabs is depicted in accordance with an advantageous embodiment. In this example, frame 500 has tabs 502, 504, 506, 508, 510, 512, 514, 516, 518, 520, 522, and 524 attached on surface 526 and surface 528. These tabs are used to attach frame 500 to a manufacturing tool for processing. In these examples, the tabs are indirectly attached to surface 526 and surface 528. The tabs are mechanically attached or locked to studs that are not visible in this illustration. These studs are rigidly fixed to these surfaces.

With reference now to FIG. 6, a diagram illustrating the welding of studs onto a part with a welding unit is depicted in accordance with an advantageous embodiment. In this example, stud gun 600 and welder 602 form welding unit 604, which is an example of welding unit 304 in FIG. 3. As depicted, welding unit 604 is a capacitor discharge stud welding unit. This type of welding unit performs capacitive welding and may be portable. Welding unit 604 is able to weld dissimilar materials to each other. Further, this type of welding is two times as fast as contact welding.

With a welding unit, such as welding unit 604, the portability provides for an ability to perform the welding of studs off line or away from an expensive machining center. This type of portability and flexibility allows for the attachment of studs to parts at different points or places. Further, capacitor discharge welding reduces the heat affected zone to a minimal amount. Thus, this type of welding ensures that all of the heat affected zone will be removed during the subsequent machining process. This removal of heat affected zones is performed to maintain part integrity on critical components.

Additionally, unlike friction welding, high contact forces are not needed with this type of welding. Of course, other types of welding, such as, for example, contact welding, friction welding, solid state welding, fusion welding, and diffusion welding also may be used, depending on the particular implementation.

In this particular example, part 606 is grounded in stud gun 600 and welds a stud onto part 606. Of course, other types of attachment processes other than welding may be used to attach a stud onto part other than welding. For example, without limitation, a stud could be adhesively attached to part 606.

Turning next to FIG. 7, a diagram illustrating the welding of a stud onto a part is depicted in accordance with an advantageous embodiment. In this example, stud 700 is ready to be welded onto part 708. In this example, studs 700, 702, and 704 are shown in different phases of being welded to surface 706 of part 708. In this example, tip 710 is in contact with surface 706 of part 708. Stud 702 illustrates a stud in which welding has begun. As can be seen, the material around tip 712 has begun to reflow. The welding causes the material at and around tip 712 to melt or reflow and coalesce with surface 706. Stud 704 illustrates a stud in which welding has been completed.

In these examples, the welding may take around 0.004 seconds to complete. Further the welding may be performed using a number of different types of energy sources. For example, a gas flame, an electric arc, a laser, an electron beam, friction, and an ultrasound are some non-limiting examples of energy sources that may be used to weld a stud to a part.

In these examples, the studs take the form of titanium studs. These studs may be applied to other metals, such as steel, aluminum, titanium, or other metal alloys. Further, the studs also may be made of different types of metals, depending on the particular embodiment.

With the use of studs, tabs may be attached to components with irregular cross-sections and/or complex shapes. Further, the attachment of tabs with studs may be performed off line from the machining area. This type of process provides flexibility as to when and where tabs may be attached to parts.

Turning now to FIG. 8, a cross-sectional view of a stud attached to a part is depicted in accordance with an advantageous embodiment. In this example, stud 800 has been welded to part 802. The welding is performed using capacitor discharge welding, in this example. This type of welding provides a minimal heat affected zone as compared to other types of welding processes.

Section 804 shows a fused area between stud 800 and surface 806 of part 802. In this example, part 802 is a titanium part.

Turning now to FIG. 9, a more detailed cross-sectional view of an interface between a stud and a part is depicted in accordance with an advantageous embodiment. In this example, the heat affected area in the part 802 is around 0.008 inches as can be seen in section 900. Section 804 is an area where fusion has occurred between stud 800 and part 802. The metals in both of these components may have melted and fused in this particular portion. In the different advantageous embodiments, the part is machined or processed to remove this material. In these examples, about 0.2 inches of excess material is typically included on the part periphery to ensure the heat affected zone is entirely machined away. Section 900 represents a heat affected zone to be machined away on the finished part.

Figure 10:
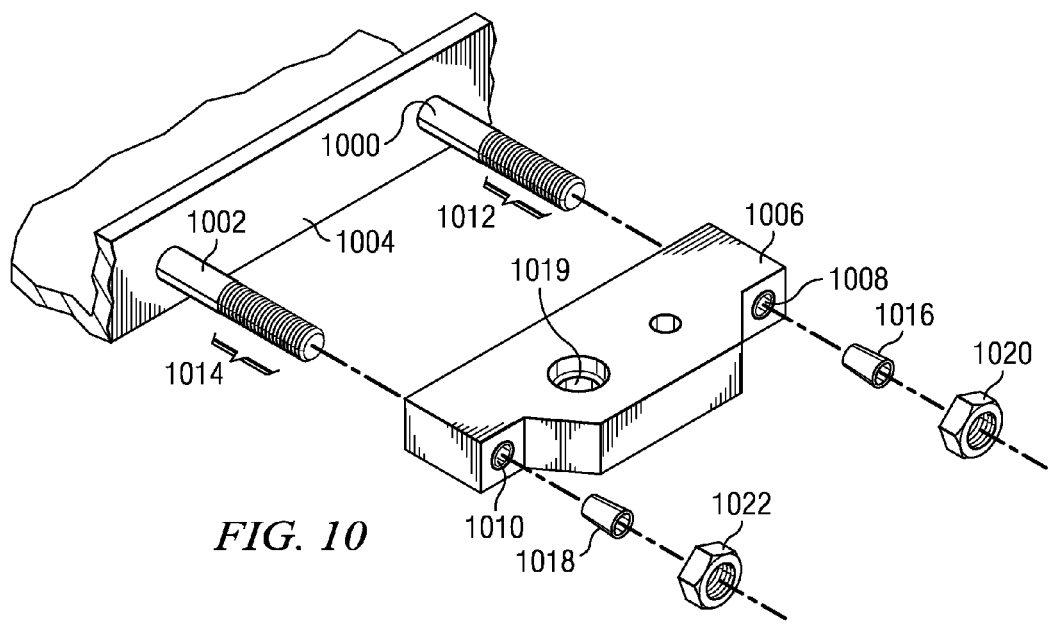
FIG. 10 is a diagram illustrating the placement of a tab onto a part in accordance with an advantageous embodiment.

With reference now to FIG. 10, a diagram illustrating the placement of a tab onto a part is depicted in accordance with an advantageous embodiment. In this example, studs 1000 and 1002 have been welded onto part 1004. At this point, tab 1006 may be attached to studs 1000 and 1002 by placing studs 1000 and 1002 into channels 1008 and 1010. Sections 1012 and 1014 are threaded sections for studs 1000 and 1002, respectively. These sections may be fastened to tab 1006 through fasteners 1020 and 1022. Tab 1006 is now rigidly attached to part 1004. Devices 1016 and 1018 ensure that a mechanical lock exists between tab 1006 to studs 1000 and 1002 when fasteners 1020 and 1022 are attached to studs 1000 and 1002.

Depending on the implementation, devices 1016 and 1018 may be omitted with fasteners 1020 and 1022 providing a feature for mechanical locking. As another non-limiting example, studs 1000 and 1002 also may take the form of a rivet, rather than having sections 1012 and 1014. Any mechanism for mechanically attaching studs 1000 and 1002 to tab 1006 may be used.

In this example, tab 1006 also includes channel 1019. This channel 1019 may be used with a fastener to fasten or affix tab 1006 to a manufacturing tool.

In this example, tab 1006 is attached to two studs, stud 1000 and stud 1002. In other embodiments, other numbers of studs may be used. For example, a single stud may be used with respect to tab 1006. In other embodiments, three studs may be used. Further, in these examples, devices 1018 and 1016 are shown as being fastened to sections 1012 and 1014 on studs 1000 and 1002.

In other embodiments, a fastener, such as fasteners 1020 are 1022 are unnecessary, as in the case where studs 1000 and 1002 are integral (one-piece) with tab 1006. Another embodiment might include a single stud with a threaded section may be placed into a channel in which the channel has a threaded surface or interior to attach the tab to the stud. Of course, other fastening mechanisms also may be used in addition to these.

Figure 11:
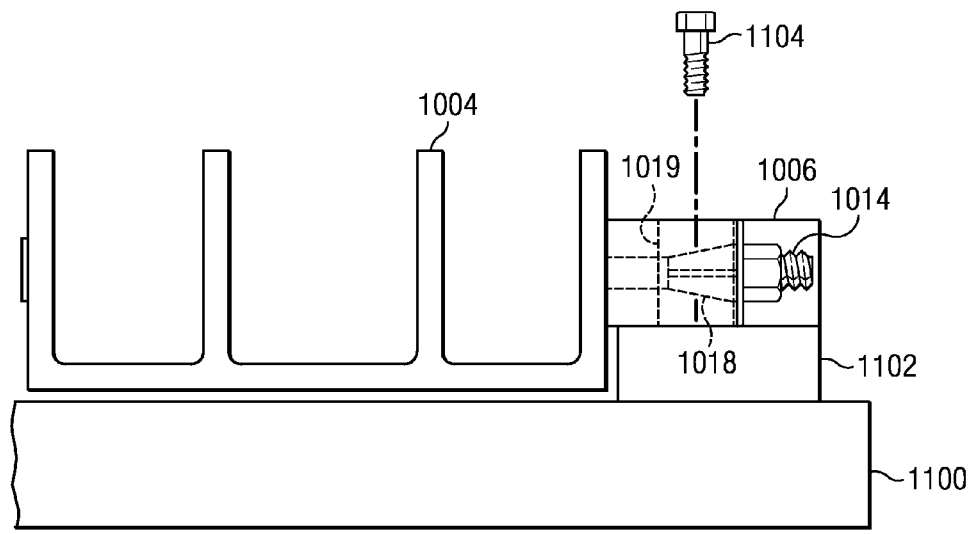
FIG. 11 is a diagram illustrating the holding of a part on a manufacturing tool in accordance with an advantageous embodiment.

Turning now to FIG. 11, a diagram illustrating the holding of a part on a manufacturing tool is depicted in accordance with an advantageous embodiment. In this example, part 1004 is placed onto machine tool table 1100, which is a part of a manufacturing tool. Tab 1006 is placed onto fastening block 1102 and bolt 1104 is placed through channel 1019 as shown in FIG. 10 to fasten tab 1006 to machine tool table 1100.

In this manner, the use for a larger block of material to create the machine tabs into part 1004 is unnecessary. As a result, less material is needed to form part 1004, in these examples. With this type of tab assembly, tab 1006 may be manufactured using a different type of material as compared to stud 1000 and 1002 in FIG. 10. Further, tab 1006 may be of a different type of material from part 1004. For example, tab 1006 may be made of a different type of metal or alloy as compared to part 1004. In addition, tab 1006 may even be made of non-metal materials, such as, for example, a plastic or composite material, depending on the particular implementation.

Figure 12:
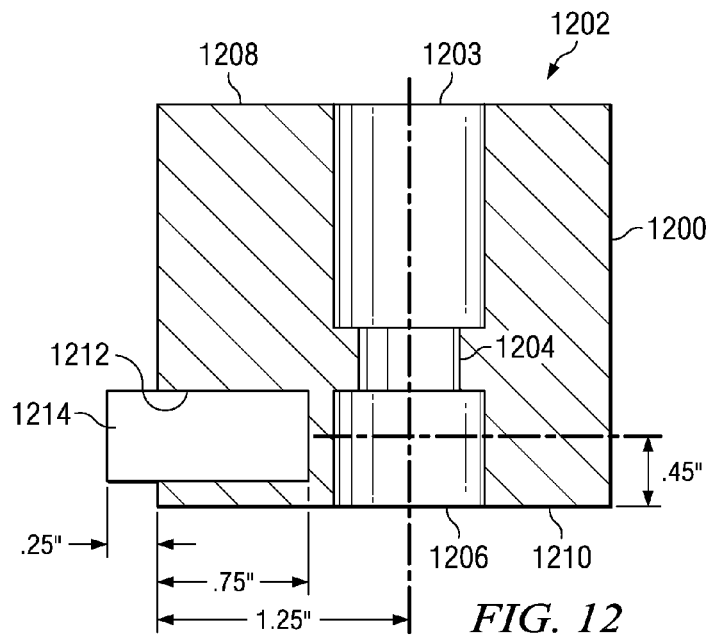
FIG. 12 is a diagram illustrating a cross-section of a tab in a stud in accordance with an advantageous embodiment.

Turning now to FIG. 12, a diagram illustrating a cross-section of a tab in a stud is depicted in accordance with an advantageous embodiment. In this example, tab 1200 includes channel 1202, which has different diameters or radii through tab 1200. Channel 1202 has a first diameter in section 1203, a second diameter in section 1204, and a third diameter in section 1206. In this example, sections 1203 and 1206 have the same diameter. Section 1203 and section 1206 have wider diameters than section 1204, in these examples. Sections 1203 and 1206 in channel 1202 are designed to allow the head of a fastener, such as a bolt, to be placed completely within channel 1202 such that the head of the bolt or other fastener does not protrude or extend above surface 1208 or surface 1210 when tab 1200 is fastened to a manufacturing tool or other structure.

In this example, tab 1200 also includes channel 1212 through which stud 1214 may be inserted. In these particular examples, another fastener is unnecessary because channel 1212 is threaded to receive stud 1214.

As illustrated, tab 1200 is around 1.75 inches wide and around two inches tall. Further, tab 1200 also includes section 1216. This is a machined section, which may be removed during processing of the part. In other words, section 1216 may be machined away from tab 1200 during the processing of this part with a manufacturing tool.

Figure 13:
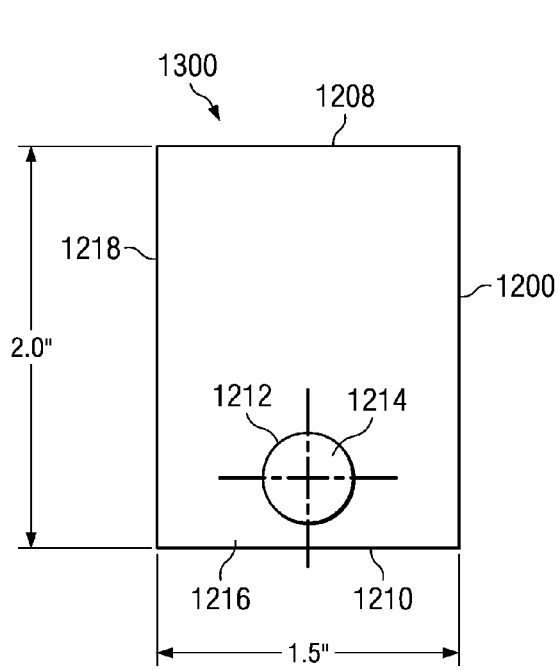
FIG. 13 is a front view of a tab in accordance with an advantageous embodiment.

Turning now to FIG. 13, a front view of a tab is depicted in accordance with an advantageous embodiment. Channel 1212 with stud 1214 is visible from this view of tab 1200. In this example, surface 1300 is around 1.5 inches wide.

The different dimensions and configurations in these figures are provided as an illustrative example of one advantageous embodiment and not meant to limit the configuration or dimensions that may be used. For example, a tab may include two channels for fasteners. The channels also do not have to be round or circular. A portion of the channel or all of the channel could have a hexagonal or octagonal shape. Thus, the different dimensions described and shown may vary, depending on the implementation. Further, tabs of different sizes or dimensions may be attached to the same part.

Figure 14:
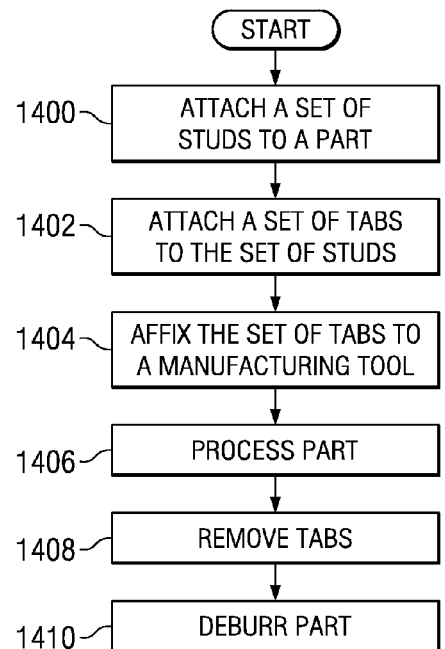
FIG. 14 is a flowchart of a process for manufacturing a part in accordance with an advantageous embodiment.

Turning now to FIG. 14, a flowchart of a process for manufacturing a part is depicted in accordance with an advantageous embodiment. The process begins by attaching a set of studs to a part (operation 1400). In these examples, the studs are rigidly attached to the part through a welding process. The set of tabs are one or more tabs, in these examples. The part may have been initially processed or formed through processes, such as, for example, without limitation, extrusion, machining, and water jet cutting.

Next, a set of tabs are attached to the set of studs (operation 1402). The set of studs are one or more studs, in these examples. Depending on the particular implementation, one tab may be attached to one stud. In other examples, a tab may be attached to two or more studs. The tabs may be attached to studs through a fastener or through threads located in the channel in the tabs.

After the set of tabs have been attached to the studs, the set of tabs are affixed to a manufacturing tool (operation 1404). Thereafter, the part is processed using the manufacturing tool (operation 1406). This processing may include, for example, drilling, machining, lathing, or painting.

After the part has been processed, the tabs may be removed (operation 1408). The tabs may be removed by applying a bending/shearing type force to the tabs to cause the studs to snap off. The tabs, in these examples, are easier to remove because they are not formed as part of the part. Additional, the tab itself is not welded to or directly affixed to the part. The studs have a smaller area, as compared to the tab, that is attached to the part. The studs may be undercut at the completion of machining or processing such that they may be more easily removed or "snapped" off by hand rather than if the tab itself was attached or welded to the part. Current processes, in which tabs are formed on the part, require machining or other processing to remove the tabs from the part.

Thereafter, the part may be deburred to remove any rough surfaces on the part left from the attachment of the stud (operation 1410). The process then terminates.

Thus the different embodiments provide a method and apparatus for processing a part. In one advantageous embodiment, a setoff set of studs are welded to a part to form a set of fixed studs. A set of tabs are attached to the set of fixed studs. The set of tabs are affixed to a manufacturing tool.

As a result, some or all of the different advantageous embodiments provide for an ability to reduce the amount of material needed for a part. This reduction in the needed amount of material for a part occurs in some of the advantageous embodiments because the amount of material needed for the part does not have to take into account machining or forming tabs as part of the part. Instead, the tabs may be attached through the attachment of studs to the part. Tabs are then attached to the studs to provide for a component to hold the part to a manufacturing tool for processing. Further, this type of configuration allows for flexibility in the location of tabs as well as a modular configuration of tabs. Further, different types of tabs may be attached to the same part, depending on the type of holding mechanism needed.

The description of the present invention has been presented for purposes of illustration and description, and is not intended to be exhaustive or limited to the invention in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the invention, the practical application, and to enable others of ordinary skill in the art to understand the invention for various embodiments with various modifications as are suited to the particular use contemplated.

What is claimed is:

1. A method for processing a part, the method comprising:
    rigidly attaching a set of studs to the part to form a set of fixed studs, wherein a heat affected zone is created on the part as a result of rigidly attaching the set of studs to the part;
    attaching a set of tabs to the part using the set of fixed studs, wherein each stud in the set of studs has a threaded section, wherein each tab in the set of tabs comprises a first number of channels configured to receive the threaded section of each stud and a second number of channels, wherein the first number of channels and the second number of channels run perpendicular to each other through the each tab, and wherein attaching the set of tabs to the part comprises placing the threaded section into the first number of channels;
    affixing the set of tabs to a manufacturing tool table using the second number of channels and a number of fasteners, wherein the set of tabs is placed onto a fastening block and the number of fasteners is placed through the second number of channels to fasten the set of tabs to the manufacturing tool table; and
    processing the part such that the heat affected zone resulting from rigidly attaching the set of studs to the part to form the set of fixed studs is removed prior to placing the part into service.

2. The method of claim 1, wherein the attaching step comprises:
    welding the set of studs to the part using a capacitive discharge welding tool.

3. The method of claim 1, wherein the set of studs are comprised of a same material as the part.

4. The method of claim 1, wherein the set of studs are comprised of a different material from the set of tabs.

5. The method of claim 1, wherein the set of studs includes one stud for each tab.

6. The method of claim 1 further comprising:
    processing the part using a manufacturing tool.

7. The method of claim 6, wherein the processing step comprises at least one of drilling, machining, or painting the part.

8. The method of claim 1 further comprising:
    removing the set of tabs and the set of studs from the part; and
    deburring the part to remove any rough surfaces on the part left from the attachment of the set of studs.

* * * * *